Jan. 4, 1938.  C. O. LYONS  2,104,263

SLED

Filed June 5, 1937

INVENTOR.
CLYDE O. LYONS
BY M. Talbert Dick
ATTORNEY.

Patented Jan. 4, 1938

2,104,263

UNITED STATES PATENT OFFICE 2,104,263

SLED

Clyde O. Lyons, Des Moines, Iowa

Application June 5, 1937, Serial No. 146,635

6 Claims. (Cl. 280—16)

The principal object of my invention is to provide an ice or snow sled that has all of its runners in the same longitudinal plane.

A further object of this invention is to provide a sled of the single runner type that has auxiliary balancing runners for holding the sled in near normal coasting position under certain circumstances.

A still further object of my invention is to provide a sled having foldable auxiliary balancing runners that are under the complete control of the operator at all times.

A still further object of this invention is to provide a sled that is economical in manufacture and durable in use.

These and other objects will be appreciated by those skilled in the art.

My invention consists in the construction, arrangement and combination of the various parts of the device, whereby the objects contemplated are attained as hereinafter more fully set forth, pointed out in my claims and illustrated in the accompanying drawing, in which:

The use of sleds is very old. Most sleds have two runners or lines of runners laterally spaced apart. Obviously, such sleds are self-balancing and there is little the operator can do but ride them. My sled on the other hand, due to its single row runners must be balanced and guided by the user much like a bicycle, thereby greatly enhancing the pleasure and skill necessary to maneuver it.

Figure 3:
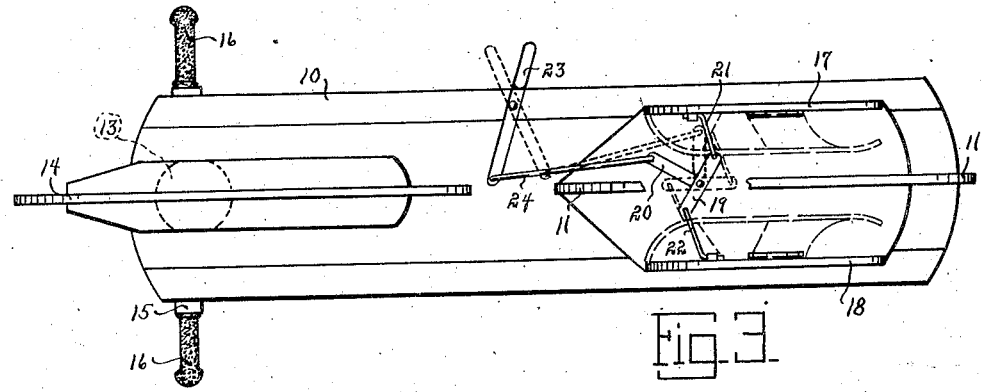
Fig. 3 is a bottom view of my sled and more fully illustrates its construction.
Figure 4:
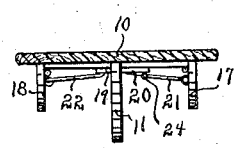
Fig. 4 is a cross sectional view of the sled taken on the line 4—4 of Fig. 2.

Referring to the drawing, I have used the numeral 10 to designate the elongated platform of the sled. The numeral 11 designates the rear runner rigidly fixed to the bottom rear end center portion of the platform. The numeral 12 designates the guiding shaft vertically and rotatably extending through the front end portion of the platform. The numeral 13 designates a bearing element rigidly secured on the lower end of the shaft 12. The numeral 14 designates the front runner rigidly secured on the bottom of the bearing element 13. This front runner, although movable for guiding purposes, normally rests parallel with the rear runner and is directly in front of the rear runner as shown in Fig. 3. By these two runners resting in the same longitudinal plane, the rear runner will normally follow in the path of the front runner. The numeral 15 designates the handle bar having rubber or like grips 16. This bar 15 is rigidly secured at its center to the top of the shaft 12. By this construction, the user may guide and balance the device by the manipulation of the bar 15, which will actuate the runner 14 in the same manner that the front wheel of a bicycle is manipulated.

During the actual coasting operation, the sled is balanced on and completely supported by the front and rear runners. Obviously, however, when the sled comes to a standstill or near a standstill, it can not be properly balanced and will fall over either to left or right. To prevent the complete turning movement of the sled laterally to left or right, I have provided auxiliary balancing runners 17 and 18. These two runners 17 and 18 are hinged to the under rear end portion of the platform and are spaced apart at each side of the rear runner 11 as shown in Fig. 3. By being hinged to swing inwardly to vertical positions as shown by dotted lines in Fig. 3, they must be some distance from the runner 11 and near the outer side edges of the platform respectively. These auxiliary runners have a height much less than the height of the main runners 11 and 14, and obviously, even when in vertical positions, can not engage the snow or ice unless the platform is slightly tilted laterally to bring one or the other into contact with the snow or ice. However, when in lowered positions, these auxiliary runners do prevent the maximum side tilting of the sled and the spilling of the one coasting on the sled when the sled approaches a standstill. Also, these auxiliary runners keep the sled in near enough normal balanced position to permit the sled being pulled back up the hill. As these runners 17 and 18 do not extend downwardly to the bottom plane of the main runners, it is possible to coast on the sled with them in lowered vertical positions. However, most coasters while coasting will desire to have them up in horizontal positions to afford more flexibility in maneuvering and balancing the sled.

Figure 1:
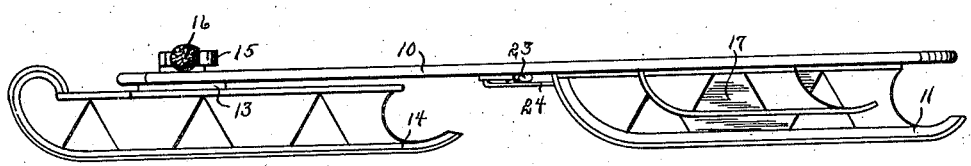
Fig. 1 is a side view of my complete sled ready for use.
Figure 2:
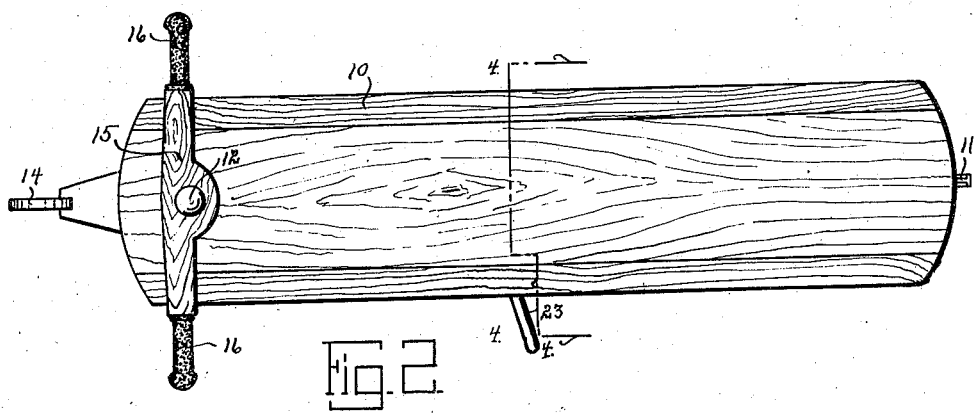
Fig. 2 is a top plan view of my device.

Many different means may be used to control these runners 17 and 18. In the drawing I show a bar 19 rotatably mounted at its center to the bottom of the platform. The numeral 20 designates a tongue rigidly secured to the center of the bar 19 and extending forwardly. This tongue and bar form a T-shaped element. The numeral 21 designates a rod pivotally connected at its outer end to the runner 17 and its inner end vertically rotatably connected to one end of the bar. The numeral 22 designates a similar rod pivotly connected at its outer end to the runner 18 and its inner end vertically rotatably connected to the other end of the bar. By this construction, when the bar is rotated the auxiliary runners will be pulled toward it in folded condition as shown by dotted lines in Fig. 3 and when the bar is rotated to a position as shown by full lines in Fig. 3 the auxiliary runners will be in extending operative positions. The numeral 23 designates a handle rotatably mounted to the platform and extending to the side of the platform as shown in Fig. 2. The numeral 24 designates a link rod having one end pivotally connected to the inner end of the handle and its other end pivotally connected to the outer end of the tongue. By this arrangement the one on the sled may operate the handle and be able at all times to control the auxiliary runners. When nearing a standstill the coaster may operate the handle and bring the auxiliary runners into lateral supporting action. The handle may be positioned at any suitable location on the sled.

Some changes may be made in the construction and arrangement of my improved sled without departing from the real spirit and purpose of my invention, and it is my intention to cover by my claims any modified forms of structure or use of mechanical equivalents which may be reasonably included within their scope.

I claim:

1. In a device of the class described, a platform, a fixed runner secured to said platform, a movable runner rotatably secured to said platform; said two runners normally extending in the same longitudinal plane, a handle element secured to said movable runner for manually moving the same, and an auxiliary runner secured to said platform not in the same longitudinal plane of said first mentioned runners and terminating in a plane above the bottom plane of said first mentioned runners.

2. In a device of the class described, a platform, a fixed runner secured to said platform, a movable runner rotatably secured to said platform; said two runners normally extending in the same longitudinal plane, a handle element secured to said movable runner for manually moving the same, and auxiliary runners secured to said platform not in the same longitudinal plane of said first mentioned runners and terminating in a plane above the bottom plane of said first mentioned runners.

3. In a device of the class described, a platform, a fixed runner secured to said platform, a movable runner rotatably secured to said platform; said two runners normally extending in the same longitudinal plane, a handle element secured to said movable runner manually moving the same, and an auxiliary runner hingedly secured to said platform not in the same longitudinal plane of said first mentioned runners and terminating in a plane above the bottom plane of said first mentioned runners.

4. In a device of the class described, a platform, a fixed runner secured to said platform, a movable runner rotatably secured to said platform; said two runners normally extending in the same longitudinal plane, a handle element secured to said movable runner for manually moving the same, an auxiliary runner hingedly secured to said platform not in the same longitudinal plane of said first mentioned runners and terminating in a plane above the bottom plane of said first mentioned runners, and a means for holding said runner in various positions of its swinging movement.

5. In a device of the class described, a platform, a rear fixed runner secured to said platform, a movable runner rotatably secured to said platform and normally in a plane directly in front of said fixed rear runner, a handle bar element operatively secured to said movable runner for facilitating its manual manipulation, and two spaced apart auxiliary runners secured to said platform and positioned at each side of said first mentioned runners respectively; said auxiliary runners having a height less than the height of said first mentioned runners.

6. In a device of the class described, a platform, a rear fixed runner secured to said platform, a movable runner rotatably secured to said platform and normally in a plane directly in front of said fixed rear runner, a handle bar element operatively secured to said movable runner for facilitating its manual manipulation, two spaced apart auxiliary runners hingedly secured to said platform and positioned at each side of said first mentioned runner, a means operatively connected to both of said auxiliary runners for causing them to fold to horizontal positions adjacent said platform or to extended vertical positions, and a manually operated member on said platform operatively connected to said means.

CLYDE O. LYONS.